United States Patent [19]

Tribe

[11] 3,960,248

[45] June 1, 1976

[54] SPEED SENSING DEVICE

[75] Inventor: Leonard T. Tribe, Ann Arbor, Mich.

[73] Assignee: Kelsey-Hayes Company, Romulus, Mich.

[22] Filed: July 16, 1975

[21] Appl. No.: 596,400

[52] U.S. Cl. .................. 188/181 R; 303/21 CF; 310/168
[51] Int. Cl.² .................................... B60T 8/02
[58] Field of Search .......... 188/181 A, 181 R; 303/21 CF, 21 CG; 310/168

[56] References Cited
UNITED STATES PATENTS

| | | |
|---|---|---|
| 3,683,219 | 8/1972 | Kruse ..................... 188/181 A X |
| 3,887,046 | 6/1975 | Bueler ..................... 188/181 R |
| 3,910,386 | 10/1975 | Stigall et al. ............. 188/181 R |

Primary Examiner—Duane A. Reger
Attorney, Agent, or Firm—Harness, Dickey & Pierce

[57] ABSTRACT

A speed sensing device for a wheeled vehicle in which the sensing device is mounted within a cavity formed at the outer end of an axle shaft. A flexible and splined drive connection transfers the drive from the wheel of the vehicle to the rotor of the speed sensing device. In this way, axial, angular and radial variations in spacing between the wheel and axle will not affect the signal generated by the speed sensing device nor will such variations subject the speed sensing device to undue loads.

15 Claims, 2 Drawing Figures

3,960,248

SPEED SENSING DEVICE

BACKGROUND OF THE INVENTION

This invention relates to a speed sensing device for a wheeled vehicle and more particularly to a speed sensor particularly adapted for use in a skid control system.

In many instances it is desirable to provide a signal indicative of the rotational speed of a wheel on a vehicle. Such speed sensing devices are commonly used to provide an input signal to the computer of a skid control system for processing to determine variations in wheel speed or wheel acceleration and deceleration rates. Such devices should permit convenient mounting and should also be low in cost. Somewhat inconsistent with these requirements is the requirement that the device provide an accurate indication of wheel speed regardless of axial, angular or radial variations in the location of the rotating element, which variations arise from manufacturing tolerances. Furthermore, it is essential that the speed sensing device not be subjected to extreme loadings as a result of such variations.

It is, therefore, a principal object of the invention to provide an improved speed sensing device that accommodates variations in spacing between the rotating and fixed elements of the associated vehicle.

It is another object of the invention to provide a speed sensing device that may be positioned in a cavity at the outer end of a vehicle axle.

It is a further object of the invention to provide an improved construction for an in-axle wheel speed sensor and an improved driving arrangement therefor.

SUMMARY OF THE INVENTION

This invention is adapted to be embodied in a speed sensing device for a wheeled vehicle and which is adapted to be fixed in a cavity at the outer end of an axle. The speed sensing device comprises an outer housing that is adapted to be supported at least in part in the axle cavity. A stator is carried by the housing and cooperates with a rotor journaled by the housing. Electromagnetic means provide an electrical signal indicative of speed upon relative rotation between the rotor and the stator. Splines are formed on the rotor for providing a sliding drive connection from the associated wheel to the rotor for driving the rotor in timed relation to the wheel and for permitting axial variations in spacing between the wheel and axle without exerting axial forces on the rotor.

Another feature of the invention is adapted to be embodied in a comination of a speed sensing device as described in the preceding paragraph with a vehicle wheel and axle. A further splined member is resiliently connected to the wheel to permit axial, radial and angular variations between this splined member and the wheel. The splined member is interfitted with the splines of the rotor for driving the rotor.

DESCRIPTION OF THE PREFERRED EMBODIMENT

Figure 1:
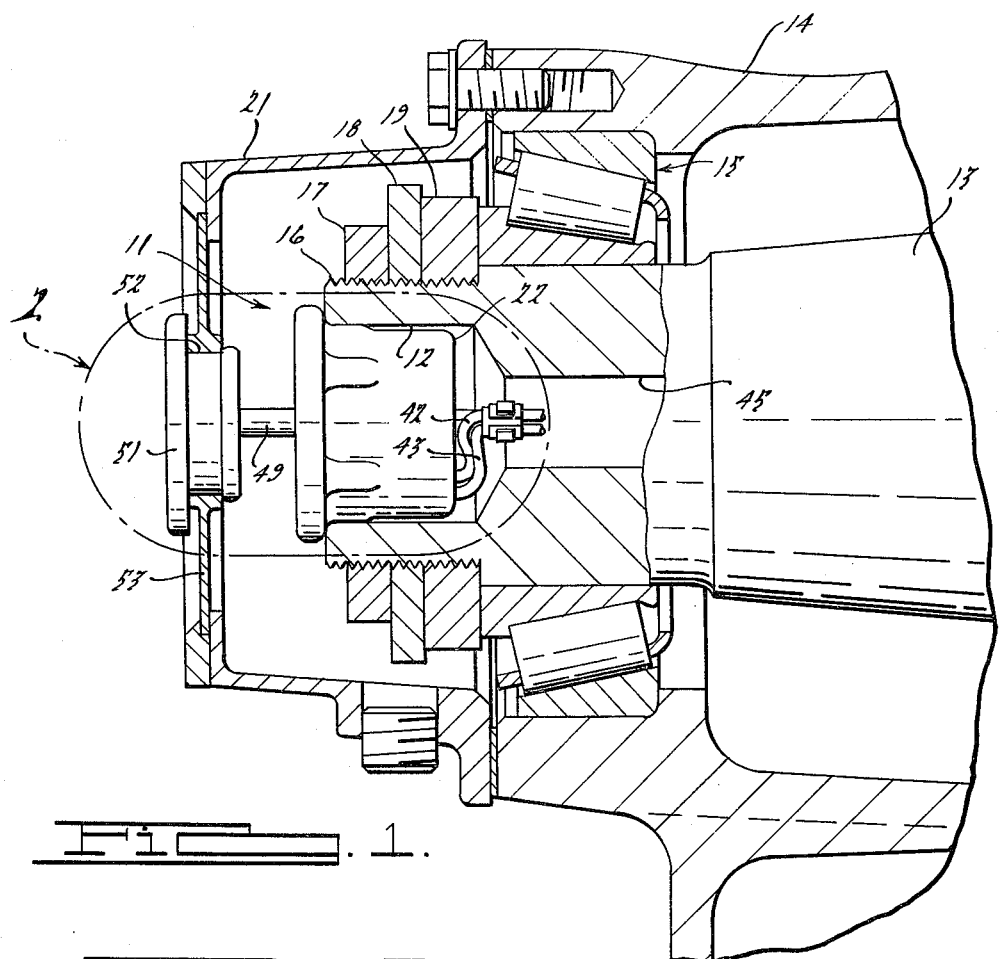
FIG. 1 is a vertical section taken through a vehicle wheel and axle assembly embodying this invention.

Referring first to FIG. 1, a speed sensing device embodying this invention is identified generally by the reference numeral 11. The speed sensing device is positioned in a cavity 12 formed at the outer end of a stationary axle 13 of a vehicle. A wheel 14 is rotatably supported on the axle 13, as is well known in this art, by an outer wheel bearing 15 and an inner wheel bearing (not shown). The outer end of the axle 13 is threaded, as at 16, to receive a nut 17 and spacers 18 and 19 for axially preloading the bearing 15.

A hub cap 21 is affixed to the wheel 14 and overlies the end of the axle 13. The hub cap 21 is affixed to the wheel 14 by bolts, only one of which shows in the drawings.

Figure 2:
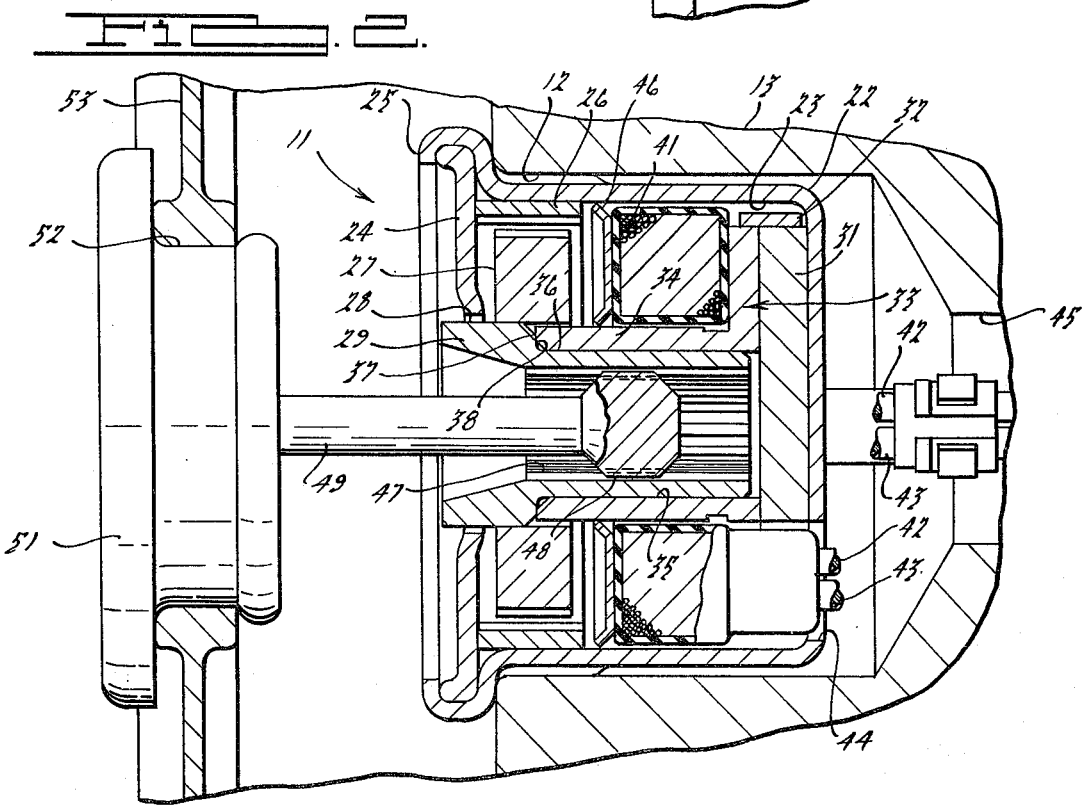
FIG. 2 is an enlarged view, in further section, of the areas encompassed by the phantom line 2 in FIG. 1.

Referring now to FIG. 2, the construction of the speed sensing device 11 will be described in detail. The speed sensing device 11 includes a generally cup-shaped sheet metal outer housing 22 that defines an internal cavity 23. A closure member 24 is affixed to the cup-shaped member 22 by a crimped-over end portion 25. A toothed stator 26 is pressed within the hub cap 21 and axially abuts the end closure 24. A toothed rotor 27 is juxtaposed to the stator 26 and defines an air gap therebetween. The rotor 27 is pressed onto an enlarged diameter portion 28 of a drive sleeve or shaft 29. The drive sleeve 29 is formed from sintered bronze so as to provide a good bearing surface, as will become apparent.

A permanent magnet 31 is supported within the housing 22 at its base. A locater ring 32 encircles and supports the magnet 31 and a supporting collar 33. The supporting collar 33 has an extending pilot portion 34 formed with a bore 35 that journals a reduced diameter portion 36 of the drive sleeve 29. Facing shoulders 37 and 38 of the collar 33 and drive sleeve 29 provide axial allignment between these elements. A wound electrical coil 41 encircles the collar portion 34 and has terminals 42 and 43 that extend outwardly through an opening 44 in the outer housing 22. The terminals 42 and 43 pass through a central bore 45 in the axle 13 for a suitable connection to a computer of a skid control module.

A centering washer 46 is juxtaposed to the coil 41 and engages the housing 22 and supporting collar portion 34 to provide radial support for the outer end of the collar 33.

The drive sleeve 29 is formed with female splines 47 to receive male splines 48 of an input shaft or connector 49. The spline connections 47 and 48 permit axial and some slight pivotal movement between the input drive 49 and the drive sleeve 29 without exerting either angular or axial forces on the sleeve 29 and associated rotor 27. The input drive 49 is connected to the wheel 14 via the hub cap 21 and a resilient puck 51. The puck 51 has a circumferential groove 52 that is received within a diaphragm 53 that is affixed across the open end of the cap 21. The puck 51 permits angular movement and radial movement to occur between the wheel 14, hub cap 21 and the input shaft 49.

It should be readily apparent from the foregoing description that radial, angular and axial misalignments between the wheel 14 and axle shaft 13 may occur without exerting any corresponding forces upon the components of the speed sensing device 11. Therefore, such variations will not cause wear of the components of the speed sensing device 11 nor will they cause variations in its output signal.

It is to be understood that the foregoing description is that of a preferred embodiment of the invention. Various changes and modifications may be made without departing from the spirit and scope of the invention as defined by the appended claims.

I claim:

1. A speed sensing device for a wheeled vehicle or the like and adapted to be fitted in a cavity at the outer end of an axle, said speed sensing device comprising an outer housing adapted to be supported at least in part in the axle cavity, a stator carried by said housing, a rotor journaled in said housing for rotation relative to said stator, electromagnetic means for providing an electronic signal indicative of speed upon relative rotation between said rotor and said stator, and splines formed on said rotor for providing a sliding drive connection from the associated wheel to said rotor for driving said rotor in timed relation to the wheel and for permitting axial variations in spacing between the wheel and axle without exerting axial forces on said rotor.

2. A speed sensing device as set forth in claim 1 wherein the splines are formed internally of a sleeve affixed to the rotor, the means for rotatably supporting said rotor comprising a collar fixed to the outer housing and journalling said sleeve.

3. A speed sensing device as set forth in claim 2 wherein the sleeve and collar have abutting shoulders for axially alligning the rotor in the outer housing.

4. A speed sensing device as set forth in claim 2 wherein the electromagnetic means comprises a permanent magnet and a coil supported within the outer housing.

5. A speed sensing device as set forth in claim 4 wherein the outer housing comprises a cup-shaped member and an end plate affixed thereto.

6. A speed sensing device as set forth in calim 5 wherein the permanent magnet is positioned at the base of the outer housing, the collar having an enlarged portion fixed relative to the outer housing by a spacer, the coil encircling said collar and further including a centering washer interposed between the outer housing and the free end of the collar for radially positioning said collar.

7. A speed sensing device as set forth in claim 6 wherein the stator is positioned contiguous to the end plate and the rotor is interposed between the centering washer and the end plate.

8. In combination, a vehicle axle having a cavity at the outer end thereof, a wheel rotatably supported by said axle, a speed sensing device supported in said axle cavity, said speed sensing device comprising an outer housing supported at least in part in said axle cavity, a stator carried by said housing, a rotor journaled in said housing for rotation relative to said stator, electromagnetic means for providing an electronic signal indicative of speed upon relative rotation between said rotor and said stator, and splines formed on said rotor, a drive shaft having a splined portion engaged with said rotor splines, and means providing a driving connection between said drive shaft and said wheel.

9. A combination as set forth in claim 8 wherein the means for providing the driving connection between the wheel and the drive shaft includes means for permitting radial and angular variations therebetween.

10. A combination as set forth in claim 9 wherein the splines are formed internally of a sleeve affixed to the rotor, the means for rotatably supporting said rotor comprising a collar fixed to the outer housing and journalling said sleeve.

11. A combination as set forth in claim 10 wherein the sleeve and collar have abutting shoulders for axially alligning the rotor in the outer housing.

12. A combination as set forth in claim 10 wherein the electromagnetic means comprises a permanent magnet and a coil supported within the outer housing.

13. A combination as set forth in claim 12 wherein the outer housing comprises a cup-shaped member and an end plate affixed thereto.

14. A combination as set forth in claim 13 wherein the permanent magnet is positioned at the base of the outer housing, the collar having an enlarged portion fixed relative to the outer housing by a spacer, the coil encircling said collar and further including a centering washer interposed between the outer housing and the free end of the collar for positioning said collar.

15. A combination as set forth in claim 14 wherein the stator is positioned contiguous to the end plate and the rotor is interposed between the centering washer and the end plate.

* * * * *